United States Patent
Vogel et al.

(10) Patent No.: US 11,525,677 B2
(45) Date of Patent: Dec. 13, 2022

(54) SURVEYING APPARATUS FOR SURVEYING AN OBJECT

(71) Applicant: Trimble Jena GmbH, Jena (DE)

(72) Inventors: Michael Vogel, Schleifreisen (DE); Rolf Richter, Jena (DE); Thomas Metz, Jena (DE); Andreas Glimm, Weimar (DE); Torsten Kludas, Zottelstedt (DE); Ute Natura, Jena (DE)

(73) Assignee: Trimble Jena GmbH, Jena (DE)

(*) Notice: Subject to any disclaimer, the term of this patent is extended or adjusted under 35 U.S.C. 154(b) by 562 days.

(21) Appl. No.: 16/568,060

(22) Filed: Sep. 11, 2019

(65) Prior Publication Data

US 2020/0124417 A1 Apr. 23, 2020

(30) Foreign Application Priority Data

Oct. 17, 2018 (EP) .................................... 18200906

(51) Int. Cl.
*G01C 3/08* (2006.01)
*G01C 15/00* (2006.01)
(Continued)

(52) U.S. Cl.
CPC ............ *G01C 15/006* (2013.01); *G01C 1/04* (2013.01); *G01C 3/08* (2013.01); *G01C 15/02* (2013.01); *G01S 17/66* (2013.01)

(58) Field of Classification Search
None
See application file for complete search history.

(56) References Cited

U.S. PATENT DOCUMENTS

| 5,883,969 A | 3/1999 | Le Gouzouguec et al. |
| 5,905,592 A * | 5/1999 | Gohdo ..................... G01C 1/02 359/399 |

(Continued)

FOREIGN PATENT DOCUMENTS

| DE | 11 2012 007 096 T5 | 8/2015 |
| EP | 0 661 519 A1 | 7/1995 |

(Continued)

OTHER PUBLICATIONS

U.S. Appl. No. 16/595,158 Notice of Allowance dated Oct. 5, 2020, 11 pages.

(Continued)

*Primary Examiner* — Mark Hellner
(74) *Attorney, Agent, or Firm* — Kilpatrick Townsend & Stockton LLP

(57) ABSTRACT

The present invention relates to a surveying apparatus for surveying an object as well as a surveying system comprising the surveying apparatus having a simple and compact optical setup. The surveying apparatus comprises a lens arrangement including at least one movably arranged focus lens element for focusing to sight an object; an imaging unit configured to obtain an image of at least a part of the object; a distance measuring unit configured to measure a distance to the object along the optical axis of the distance measuring unit; and a beam splitter/combiner configured to combine a part of the optical imaging path of the imaging unit and a part of the optical distance measuring path of the distance measuring unit so that the optical axis of the imaging unit and the optical axis of the distance measuring unit are at least coaxially arranged with the optical axis of the lens arrangement between the lens arrangement and the beam splitter/combiner.

14 Claims, 7 Drawing Sheets

(51) Int. Cl.
  *G01C 1/04* (2006.01)
  *G01C 15/02* (2006.01)
  *G01S 17/66* (2006.01)

(56) References Cited

U.S. PATENT DOCUMENTS

| | | | |
|---|---|---|---|
| 6,069,656 | A | 5/2000 | Silver |
| 6,133,998 | A | 10/2000 | Monz et al. |
| 10,917,601 | B2 | 2/2021 | Glimm |
| 2001/0050763 | A1* | 12/2001 | Shirai .............. G01S 7/4812 356/5.1 |
| 2003/0086072 | A1 | 5/2003 | Fukumoto et al. |
| 2004/0096095 | A1 | 5/2004 | Watkins |
| 2004/0208340 | A1 | 10/2004 | Kirschner |
| 2006/0114448 | A1* | 6/2006 | Andersson ............ G01C 3/08 356/4.06 |
| 2007/0104353 | A1 | 5/2007 | Vogel |
| 2008/0116354 | A1 | 5/2008 | Kirschner et al. |
| 2009/0235541 | A1* | 9/2009 | Kumagai ............ G01S 17/66 33/281 |
| 2010/0012765 | A1 | 1/2010 | Solenne |
| 2010/0037474 | A1 | 2/2010 | Hertzman et al. |
| 2010/0253931 | A1 | 10/2010 | Meier et al. |
| 2011/0023578 | A1 | 2/2011 | Grässer |
| 2011/0228099 | A1 | 9/2011 | Rakes |
| 2013/0003069 | A1 | 1/2013 | Umeda et al. |
| 2014/0009604 | A1 | 1/2014 | Hinderling et al. |
| 2014/0307252 | A1 | 10/2014 | Hinderling et al. |
| 2015/0092180 | A1 | 4/2015 | Nishita |
| 2015/0177382 | A1* | 6/2015 | Vogel .................. G01S 17/08 250/203.2 |
| 2017/0168142 | A1 | 6/2017 | Kumagai et al. |
| 2018/0176492 | A1 | 6/2018 | Bamji et al. |
| 2019/0004619 | A1* | 1/2019 | Kahle .................. G01S 17/66 |
| 2020/0124417 | A1 | 4/2020 | Vogel et al. |
| 2020/0124730 | A1 | 4/2020 | Vogel |
| 2020/0128201 | A1 | 4/2020 | Glimm |
| 2020/0166340 | A1 | 5/2020 | Hinderling |
| 2020/0263984 | A1 | 8/2020 | Vogel |
| 2020/0263986 | A1 | 8/2020 | Vogel |

FOREIGN PATENT DOCUMENTS

| | | |
|---|---|---|
| EP | 1 411 371 A1 | 4/2004 |
| EP | 1 422 498 A2 | 5/2004 |
| EP | 1 514 076 A1 | 3/2005 |
| EP | 1 681 533 A1 | 7/2006 |
| EP | 1 767 960 B1 | 10/2008 |
| EP | 2 103 905 A2 | 9/2009 |
| EP | 2 275 775 A2 | 1/2011 |
| EP | 2 408 192 A2 | 1/2012 |
| EP | 2 259 569 B1 | 6/2012 |
| EP | 2 706 376 A1 | 3/2014 |
| EP | 2 722 645 A2 | 4/2014 |
| EP | 2 789 972 A1 | 10/2014 |
| EP | 2 881 757 A1 | 6/2015 |
| EP | 2 889 576 A1 | 7/2015 |
| EP | 2 998 698 A1 | 3/2016 |
| EP | 3 130 888 A1 | 2/2017 |
| EP | 3 165 876 A2 | 5/2017 |
| EP | 3 173 816 A2 | 5/2017 |
| EP | 3 199 913 A1 | 8/2017 |
| WO | 98/10255 A1 | 3/1998 |
| WO | 99/34235 A1 | 7/1999 |
| WO | 2007/079600 A1 | 7/2007 |
| WO | 2007/118478 A1 | 10/2007 |
| WO | 2013/037848 A1 | 3/2013 |
| WO | 2014/195020 A1 | 12/2014 |
| WO | 2015/017539 A1 | 2/2015 |
| WO | 2015/136099 A2 | 9/2015 |
| WO | 2016/008513 A1 | 1/2016 |

OTHER PUBLICATIONS

European Search Report for Application No. 19155706.5, dated Jul. 10, 2019, 11 pages.
European Search Report for Application No. 18200908.4, dated Jun. 25, 2019, 20 pages.
Topcon, DS Direct Aiming Station, White Paper; Topconcorporation: "White Paper WhitePaperforTopconDSeriesAutomaticAimingTotalStations X-pointingTechnology", Mar. 4, 2015; Doc. ID: WP-P-180-2TE; 5 pages, downloaded from the Internet Oct. 25, 2019 at http://www.topconcare.com/files/2013/7525/6386/DS_WP_P-180-2_TE.pdf.
Topcon, DS Series, Direct Aiming Station, White Paper; Topcon: "Compact Robotic Total Station designed to be both versatile and agile", Jan. 1, 2014, 4 pages, downloaded from the Internet Oct. 25, 2019 at http://www.topconcare.com/files/2013/7525/6386/DS_WP_P-180-2_TE.pdf.
Callenberg, C. et al., "Snapshot Difference Imaging using Time-of-Flight Sensors," ACM Transaction on Graphics, vol. 36, No. 6, Nov. 20, 2017, 10 pages.
U.S. Appl. No. 16/601,412 Non-Final Office Action dated Oct. 20, 2021, 7 pages.
European Search Report for Application No. 18200906.8 dated Apr. 3, 2019, 10 pages.
U.S. Appl. No. 16/601,412 Final Office Action dated Apr. 12, 2022, 8 pages.
U.S. Appl. No. 16/829,992 Non-Final Office Action dated Jun. 10, 2022, 10 pages.
U.S. Appl. No. 16/601,412 Notice of Allowance dated Jul. 18, 2022, 6 pages.
U.S. Appl. No. 16/567,723 Notice of Allowance dated Jul. 21, 2022, 18 pages.
U.S. Appl. No. 16/829,992 Notice of Allowance dated Sep. 23, 2022, 5 pages.

* cited by examiner

SURVEYING APPARATUS FOR SURVEYING AN OBJECT

CROSS-REFERENCE TO RELATED APPLICATIONS

The present application claims priority to EPC Application No. 18200906.8, filed Oct. 17, 2018, the contents of which are incorporated herein by reference in their entirety for all purposes.

FIELD OF THE INVENTION

The present invention relates to a surveying apparatus for surveying an object as well as a surveying system comprising the surveying apparatus, and in particular, to a surveying apparatus comprising several modules including an imaging unit and a distance measuring unit.

BACKGROUND

Optical instruments, such as surveying instruments are commonly used for measuring a position of an object to obtain information, such as horizontal and vertical angles and distance. Newer instruments are often provided with an electronic imaging device, e.g. a camera, to acquire digital images of the object.

A conventional surveying instrument comprises a telescope system for sighting an object which can then be imaged on a camera behind the telescope system. Further, such an instrument may comprise a distance measurement unit to measure a distance to the object sighted by the telescope system. The viewing angle of the telescope system is generally very small, e.g. 1 to 2 degrees, and a user has to position the surveying instrument and adjust the optics of the telescope system so that the object to be sighted and to be measured is exactly in the small field of view of the telescope system and optimally on the optical axis of the telescope system, e.g. to measure a distance to the object.

The more functions are added to the surveying instrument, the more complex the optical setup and electronic control of the instrument gets. In recent years, surveying instruments with tracking systems have been proposed to follow the position of a moving object. Including a laser tracker comprising a laser beam to track an object further increases the complexity. Moreover, different suppliers for different functional modules exist but the complex optical setup of surveying instruments does usually not provide for simple interfaces to integrate or replace different functional modules. Accordingly, custom made solution are used which further increase the price of the instruments.

More importantly, complex optical systems are difficult to align which is particularly of concern for surveying instruments which are required to provide highly accurate position measurements, e.g. angles and distances with respect to an object. Further, these surveying instruments are used in the field, sometimes in harsh conditions, which not only requires them to be compact and low maintenance but also largely immune against shocks and temperature variations.

SUMMARY OF THE INVENTION

Therefore, there is a need for a surveying apparatus having a simple and compact optical setup.

According to an embodiment, a surveying apparatus for surveying an object comprises a lens arrangement including at least one movably arranged focus lens element for focusing to sight an object and an imaging unit configured to obtain an image of at least a part of the object. The surveying apparatus further comprises a distance measuring unit configured to measure a distance to the object along the optical axis of the distance measuring unit. The surveying apparatus further comprises a beam splitter/combiner which is configured to combine a part of the optical imaging path of the imaging unit and a part of the optical distance measuring path of the distance measuring unit so that the optical axis of the imaging unit and the optical axis of the distance measuring unit are coaxially arranged with the optical axis of the lens arrangement at least between the lens arrangement and the beam splitter/combiner. Accordingly, a compact optical setup is achieved in which the optical paths of the distance measuring unit and the imaging unit are combined so that the same lens arrangement is used for both. As a result, calibration of the apparatus and transforming directions with respect to the center of the apparatus can be simplified, in particular compared to biaxial surveying instruments (lens arrangement and distance measuring unit have no overlapping optical axes), since large parts of the optics are the same for both units.

According to an advantageous embodiment, the surveying apparatus further comprises a tracker configured to track the object. Additionally, the beam splitter/combiner is further configured to combine a part of the optical tracker path of the tracker, the part of the optical imaging path of the imaging unit and the part of the optical distance measuring path of the distance measuring unit so that the optical axis of the tracker, the optical axis of the imaging unit and the optical axis of the distance measuring unit are at least coaxially arranged with the optical axis of the lens arrangement between the lens arrangement and the beam splitter/combiner. Accordingly, a compact optical setup is achieved in which the same lens arrangement can be used for three functional modules, such as the tracker, the distance measuring unit and the imaging unit. As a result, calibration of the apparatus and transforming directions with respect to the center of the apparatus can be further simplified.

According to an advantageous embodiment, the lens arrangement of the surveying apparatus includes a movably arranged zoom lens element for zooming. Accordingly, the light to the tracker, from/to the distance measuring unit and to the imaging unit can be focused and the object zoomed. Since the two movably arranged lenses of the lens arrangement are moved with respect to each other affecting the optical paths of the three modules similarly, the calibration of the apparatus is simplified.

According to an advantageous embodiment, the lens arrangement is configured to maintain a magnification ratio so that an image size of the object on the imaging unit is maintained constant. Accordingly, an image of an object, such as a reflector, may have always the same size simplifying image processing. Further, also a laser spot of the distance measuring unit may always have the same size on the object.

According to an advantageous embodiment, the lens arrangement is configured to switch between a narrow field of view and a wide field of view. Accordingly, a wide field of view may be used to obtain an overview image of a scenery in which an object can be easily found and tracked, while a narrow field of view may be used for taking a distance measurement.

According to an advantageous embodiment, the lens in the lens arrangement facing the beam splitter/combiner has a convex side facing the beam splitter/combiner. Accordingly, light of a laser of a distance measuring unit which may be reflected from the surface of the lens will likely not be back-reflected on the distance measuring unit, and particularly not measured by its detector.

According to an advantageous embodiment, the tracker comprises a tracker receiver and/or a tracker emitter for emitting tracking light on the optical tracker path. Accordingly, the light received/transmitted by the tracker is affected by the lens arrangement in the same way as the light of the other functional modules.

According to an advantageous embodiment, the tracker comprises two tracker receivers each receiving a part of back-reflected tracker light split by a beam splitter. Accordingly, a difference image by subtracting image information of one tracker receiver taken when the object was illuminated from image information of another tracker receiver when the object was not illuminated can be obtained quickly.

According to an advantageous embodiment, the tracker is adapted to issue an instruction to the surveying apparatus to move the optical axis of the lens arrangement. Accordingly, the surveying apparatus may track the object and automatically change its observation direction to follow a moving object.

According to an advantageous embodiment, the distance measuring unit comprises a laser and/or a detector. For example, the laser of the distance measuring unit is adapted to emit laser light which is reflected by the beam splitter/combiner so as to be output coaxially to the optical axis of the lens arrangement. Accordingly, a compact distance measuring unit can be provided which can be integrated easily into the surveying apparatus and use existing optics.

According to an advantageous embodiment, the beam splitter/combiner comprises at least two wedge shaped prisms and/or comprises wavelength selective surfaces. Accordingly, several beam paths can be combined with one compact prism system.

According to an advantageous embodiment, the beam splitter/combiner is configured to split of reflected light from the object traversing the lens arrangement into imaging light along the optical imaging path and into distance measuring light along the optical distance measuring path. Accordingly, light of different wavelengths entering the lens arrangement can be split so as to travel to different modules.

According to an advantageous embodiment, the surveying apparatus further comprises a controller configured to analyze the image of the object acquired by the imaging unit and configured to issue an instruction to the lens arrangement to move one or more lenses of the lens arrangement so as to maintain an image size of the object on the imaging unit constant. Accordingly, an image of an object can be maintained at a constant magnification ratio. Having always the same size simplifies the image processing, if an electronic imaging device is used as imaging unit.

According to an advantageous embodiment, the lens arrangement further comprises a final focus lens on its optical axis, and wherein the movably arranged focus lens element is arranged between the final focus lens and the beam splitter/combiner. Accordingly, a lens arrangement which can be configured for different focus settings is provided.

According to an advantageous embodiment, the surveying apparatus further comprises a thermal imaging camera configured to acquire an image of at least part of the object. For example, the thermal imaging camera may be provided in addition or may replace the tracker or the imaging unit. Accordingly, not only images in the visible light range but also infrared light range are possible.

According to an embodiment, a surveying system comprising a remote control unit and the surveying apparatus is provided, wherein the surveying apparatus comprises a communication interface to communicate with the remote control unit. Accordingly, the apparatus of the system can be easily operated by an individual user from different locations in the field.

DETAILED DESCRIPTION OF THE PREFERRED EMBODIMENTS

Preferred embodiments of the invention are described with reference to the Figures. It is noted that the following description contains examples only and should not be construed as limiting the invention. In the following, similar or same reference signs indicate similar or same elements or functions.

Embodiments of the invention generally relate to the optical functions of a surveying apparatus and their arrangement, and particularly to an optical setup of a surveying apparatus which allows to easily integrate different functional modules into the surveying apparatus over simple interfaces so that several optical paths overlap at least along a lens arrangement. Therefore, the optical paths have the same lenses of the lens arrangement in common. In more detail, the separation of the optics of the lens arrangement from the distance measuring unit, imaging unit and tracker provides flexibility in the design of the surveying apparatus, wherein the clear and simple interfaces allow adding or replacing such functional modules.

In short, in one embodiment, the surveying apparatus comprises a lens arrangement; an imaging unit configured to obtain an image of at least a part of the object; a distance measuring unit configured to measure a distance to the object along the optical axis of the distance measuring unit; and a beam splitter/combiner. The beam splitter/combiner combines parts of the optical paths of the imaging unit and the distance measuring unit. In particular, the optical paths are arranged so that the optical axis of the imaging unit and the optical axis of the distance measuring unit are coaxial, i.e. parallel and overlapping, with the optical axis of the lens arrangement at least between the lens arrangement and the beam splitter/combiner.

Figure 1A:
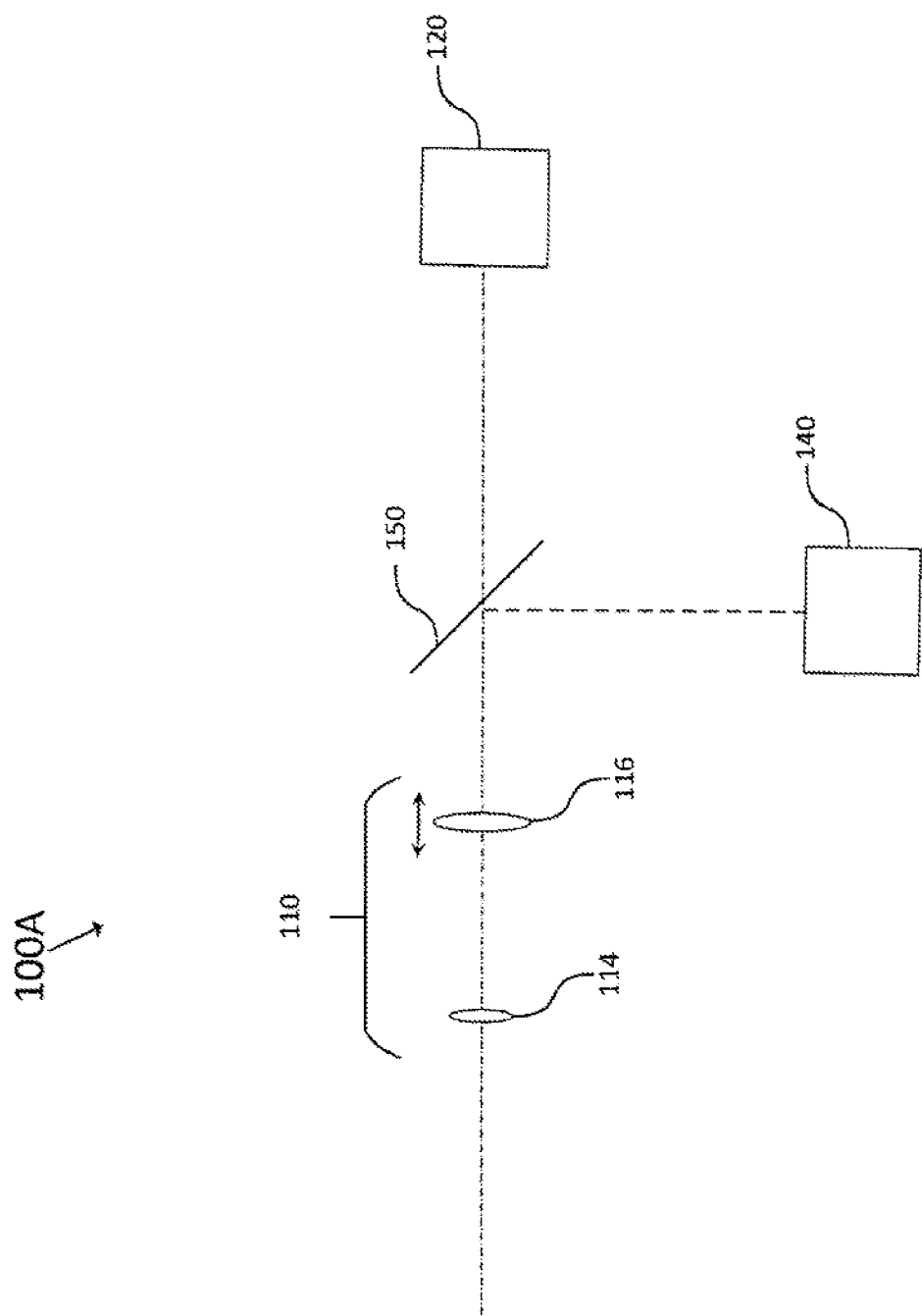
FIG. 1A illustrates elements of a surveying apparatus according to an embodiment.

FIG. 1A illustrates elements of a surveying apparatus 100A according to an embodiment. The surveying apparatus 100A comprises a lens arrangement 110, an imaging unit 120, a distance measuring unit 140 and a beam splitter/combiner 150.

The lens arrangement 110 is provided to sight an object which is a target, such as a reflector. The optical arrangement 110 includes at least one movably arranged focus lens element 116 for focusing so as to sight the object. For example, the focus lens element may be an individual or compound focusing lens which is moved manually or automatically to produce in focus/out of focus images of the object which may be viewed through an ocular constituting a simple imaging unit. The lens arrangement 110 may be part of a telescope known in the art of surveying, and may comprise several optical lenses, such as lenses 114 and 116, so as to enable focusing and zooming. In one example, the lens arrangement 110 is attached to a positioning unit so as to change the direction of the optical axis of the lens arrangement which will be discussed in more detail with respect to FIG. 6.

The imaging unit 120 is configured to obtain an image of at least a part of the object sighted by the lens arrangement 110. The imaging unit 120 may be a simple lens or an ocular, a.k.a. eyepiece, so that an image can be obtained in the eye of the user. Alternatively, the imaging unit 120 may be a combination of an electronic imaging device, a microdisplay and an ocular so that an image can be recorded and viewed conventionally by eye through an ocular. Preferably the imaging unit 120 is an electronic imaging device, for example, a two-dimensional array of sensor elements capable of generating image information with a number of pixels generally corresponding to the number of elements of the array, such as a charge-coupled device (CCD) camera or a complementary metal-oxide semiconductor (CMOS) camera. Such a sensor array may be composed of 1000×1000 sensor elements or more to generate digital images with 106 image pixels (1 megapixel) or more. However, also smaller sensor arrays are feasible, for example, composed of 480× 750 sensor elements, for example. Alternatively, the sensor array may be composed of avalanche photodiodes (APD) forming an APD array.

The distance measurement unit 140 is configured to measure a distance to the object along the optical axis of the distance measuring unit 140, which constitutes an optical measurement axis. For example, the distance measurement unit 140 uses an electronic distance measurement (EDM) to obtain measurement values about the distance. In one example, the distance measurement unit 140 includes a coherent light source, such as an infrared laser or another suitable laser, e.g. emitting in a red-wavelength range, and preferably a fast reflector-less working EDM. Conventionally collimated light is sent out in a radial direction from the surveying apparatus 100A to perform a distance measurement by using a pulse method or phase method as known in the art. Further, the intensity of a received EDM-Signal, i.e. the back-reflected signal of an electro-optical distance measurement, could also be used to obtain information about the distance to the reflecting object. A preferred embodiment of a distance measuring unit 140 will be discussed with respect to the distance measuring unit 240 in FIG. 2.

In FIG. 1A, a beam splitter/combiner 150 is provided and configured to combine a part of the optical imaging path of the imaging unit 120 and a part of the optical distance measuring path of the distance measuring unit 140 so that the optical axis of the imaging unit 120 and the optical axis of the distance measuring unit are coaxially arranged with the optical axis of the lens arrangement at least between the lens arrangement 110 and the beam splitter/combiner 150.

An optical axis may be regarded as an imaginary line that defines the path along which light propagates through the system, up to a first approximation. For a system composed of simple lenses and mirrors, an optical axis passes through the center of curvature of each surface, and coincides with the axis of rotational symmetry. The optical path may be regarded as the path that light takes when traversing an optical system, such as the lenses of the lens arrangement 110. The optical (beam) path is usually limited by a three-dimensional volume having the optical axis as an axis of rotational symmetry, in which light may travel. An example is provided with respect to FIG. 5 which is discussed below in more detail.

The optical axis of the imaging unit 120 is shown by the dot-and-dash line and the optical axis of the distance measuring unit 140 is shown by the dashed line. No preferred direction is given by the lines (optical reciprocity) but it is understood that light to be imaged on the imaging unit 120 travels from left to right. The beam splitter/combiner 150 combines these lines to obtain an overlap of the optical axes on the left part of the beam splitter/combiner 150 in FIG. 1A. Since these axes are parallel and overlapping, i.e. coaxial, to each other, and additional parallel and overlapping to the optical axis of the lens arrangement 110, they are also regarded coaxially arranged with respect to the optical axis of the lens arrangement 110.

In particular, the optical setup and especially the beam splitter/combiner 150 are chosen such that the optical axis of the lens arrangement 110 corresponds to the overlapping optical axes of the imaging unit 120 and the distance measuring unit 140 between the beam splitter/combiner 150 and the lens arrangement 110 as well as along the lens arrangement 110 so that light traveling in the respective optical paths is affected by the lenses 114 and 116 of the lens arrangement. Since the optical axes of the distance measuring unit 140 and the imaging unit 120 partly overlap, also the optical paths, i.e. the optical imaging path and the optical distance measuring path, of these units partly overlap when being combined by the beam splitter/combiner 150. In the apparatus, the center of the two dimensional array of sensor elements as imaging unit and the center of the tracking unit do not need to coincide with the optical axis of the lens arrangement 110. For example, in a calibration step, the center can be defined on the two dimensional array of sensor elements as the point where the optical axis coincides with the array.

It is understood that a coaxial arrangement of two or more optical axes is basically a theoretical assumption, since in practice the optical axes will usually not exactly overlap and point in the exact same direction but will overlap within some small error range. Thus, for ease of explanation we assume axes deviations of less than +/−0.2° still as coaxial. Typical alignment errors are in the order of +/−0.1° which can be corrected later in calibration by software.

Looking at FIG. 1A from a different perspective, according to the optical reciprocity principle, light originating on the left side in FIG. 1A, and thus entering the lens arrangement 110 from the left, will be split by the beam splitter/combiner 150. Therefore, describing that an optical path is split into two optical paths by the beam splitter/combiner (looking from left to right) is technically the same as describing that two optical paths are combined by the beam splitter/combiner (looking from right to left).

In a simple case, a semi-transparent mirror may be used as beam splitter/combiner dividing the incoming light into two parts, e.g. 50:50, one part reaching the imaging unit 120 and the other part reaching the distance measuring unit 140.

Undesired distance measuring light in the imaging channel may then be filtered before it hits the imaging unit 120. In practice, however, a dichroic mirror or prism, i.e. a mirror or prism which is transparent for one wavelength range and reflective for the other, is used. This wavelength selectivity may be achieved with dichroic filters/films using the principle of thin-film interference. Using a dichroic mirror or dichroic prism thus allows using a large percentage of reflected and transmitted light, respectively.

Accordingly, depending on the light direction and the wavelength, in addition to its configuration to combine light beams, the beam splitter/combiner 150 is also configured to split light reflected from the object traversing the lens arrangement in imaging light along the optical imaging path and in distance measuring light along the optical distance measuring path.

It is clear from the above that the optical paths and optical axes are independent of the light traveling direction so that "splitting" and "combining" is merely used to better explain the optical layout. In particular, the imaging unit in these examples only receives light and does not send out any light so that the beam splitter/combiner does not combine light from the imaging unit and the distance measuring unit but is configured with an optical function that could do so, since light entering the surveying apparatus through the lens arrangement is split in different channels by the beam splitter/combiner. In other words, the optical function of the beam splitter/combiner is to combine different paths from its right side to overlap on its left side.

In one example, a laser diode of the distance measuring unit 140 may emit light in the red range of approximately 660 nm (or 635 nm) and the imaging unit 120 may image a scenery including an object reflecting visible wavelengths. Accordingly, if a dichroic mirror with a cut-off wavelength of approximately 620 nm, i.e. wavelengths larger than 620 nm are reflected, is provided (alternatively a notch filter blocking light around 635 nm), distance measuring and imaging may be achieved in separate channels with hardly any loss in intensity. Using a dichroic prism design further allows to glue a camera chip of an imaging unit directly onto parts of the prism so that a highly compact structure is achieved which is largely insensitive to temperature changes and external shocks while mechanic components for attaching and aligning a camera chip can be saved.

Additional reliability of the measurements of the surveying apparatus can be achieved if the lens 116 in the lens arrangement 110 facing the beam splitter/combiner has a convex side, e.g. a plano-convex or a bi-convex lens, which faces the beam splitter/combiner. As a result, reflections from this lens of distance measuring light from the distance measuring unit 140 may not be reflected back to the distance measuring unit 140 so as to avoid crosstalk which could lead to the detection of signals not coming from the actual target (object). Furthermore, anti-reflection coatings on the lenses of the lens arrangement may also reduce crosstalk. When using a prism as the beam splitter/combiner 150, an intermediate focus should be placed outside and not inside the prism and the surface(s) of the prism on which light is incident may be slightly tilted with respect to an orthogonal direction so that light is not fully orthogonally incident thereon. Furthermore, air gaps between individual prisms for total reflection can be provided where appropriate.

Figure 1B:
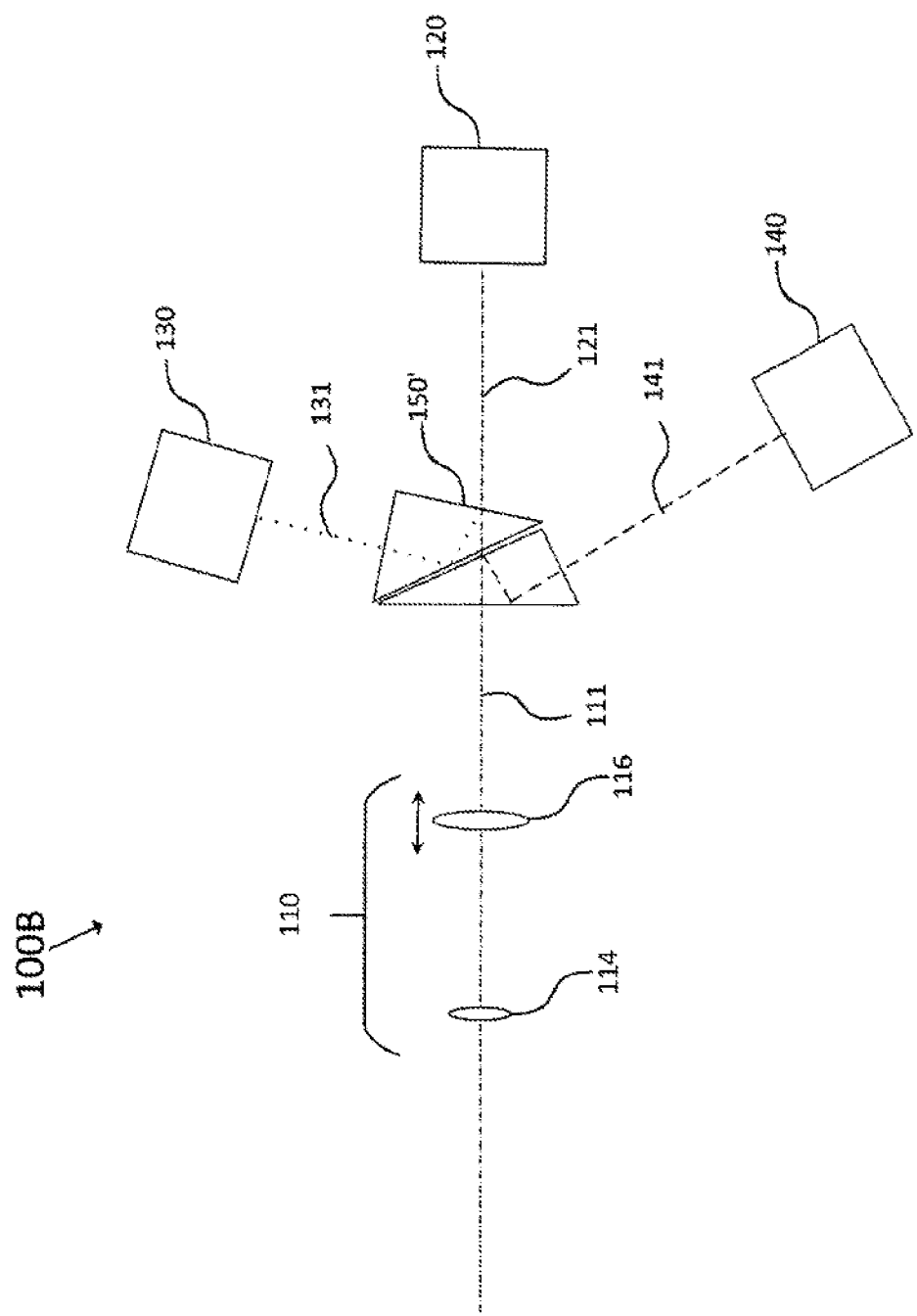
FIG. 1B illustrates elements of a surveying apparatus according to another embodiment.

In FIG. 1B, another embodiment of a surveying apparatus is provided which further builds on the surveying apparatus 100A of FIG. 1A. Specifically, the surveying apparatus 100B comprises the same elements as the surveying apparatus 100A and additionally comprises a tracker 130.

The tracker 130 is configured to track the object, e.g., a triple prism reflector, by using preferably infrared light at a wavelength of 850 nm (or 810 nm). As directly understandable from FIG. 1B, the beam splitter/combiner 150 of FIG. 1A needs some modification to combine/split the three beam paths of the tracker 130, the imaging unit 120 and the distance measuring unit 140, respectively. Thus, the beam splitter/combiner 150' is configured in FIG. 1B to combine a part of the optical tracker path of the tracker 130, a part of the optical imaging path of the imaging unit 120 and a part of the optical distance measuring path of the distance measuring unit 140 so that the optical axis of the tracker, the optical axis of the imaging unit and the optical axis of the distance measuring unit are coaxially arranged with the optical axis of the lens arrangement 110 at least between the lens arrangement and the beam splitter/combiner 150'. Thus, the lens arrangement 110 is shared by the tracking, distance measuring and imaging functions.

In more detail, in FIG. 1B, the optical axis of the tracker 130 is shown by the dotted line 131, the optical axis of the imaging unit 120 is shown by a dot-and-dash line 121 and the optical axis of the distance measuring unit 140 is shown by the dashed line 141. In FIG. 1B, it is schematically shown how light of these optical axes is reflected and transmitted by the beam splitter/combiner 150' to coincide with the optical axis 111 of the lens arrangement 110.

The prism system shown in FIG. 1B is a multi-channel prism. In particular, the prism system comprises two prisms having wedge shapes. In a preferred embodiment, the beam splitter/combiner 150' comprises at least two wedge shaped prisms and wavelength selective surfaces. A wavelength selective surface is any surface which reflects different wavelengths differently. In the above example of the dichroic mirror (or similar dichroic prism), the dichroic mirror (or dichroic prism) may also comprise a wavelength selective surface. The more optical paths need to be combined, the more prisms or mirrors (or combinations thereof) need to be provided. Thus, in a preferred embodiment having three functional modules, such as tracker 130, imaging unit 120 and distance measuring unit 140, the prism system is made up of two dichroic prisms having dichroic mirror-like surfaces.

The skilled person realizes that instead of the two dichroic prisms shown in FIG. 1B also two dichroic mirrors may be used. Therefore, similar to FIG. 1A, the optical axes of the tracker, distance measuring unit and imaging unit can be coaxially arranged with the optical axis of the lens arrangement 110 on the left side of the beam splitter/combiner 150'.

In one embodiment, the tracker 130 comprises a tracker receiver and a tracker emitter. For example, the tracker emitter is disposed together with the tracker receiver in the same tracker unit 130. In this example, the tracker emitter emits tracking light on the optical tracker path, i.e. along the optical axis 131 and 111. Details of such an arrangement are provided with respect to FIG. 5.

In another embodiment, the tracker 130 comprises two tracker receivers each receiving a part of back-reflected tracking light split by a beam splitter, e.g. prism cube. In this example, the tracker emitter may be placed at one end of the lens arrangement 110, for example, and may constitute a ring of LEDs around an opening of the lens arrangement.

The tracking light may have a wavelength in the infrared range, such as 850 nm, the distance measuring light may have a wavelength in the red range, such as 633 nm, e.g. from a He—Ne-Laser, and the imaging unit may receive visible light below the red distance measuring light. The prism system 150' may then be provided with suitable wavelength selective surfaces to guide outgoing light to and through the lens arrangement 110 and separate incoming light to reach the three individual channels.

Accordingly, the incoming light which may comprise tracking light reflected from the object, ambient light reflected from the object as well as from other structures in the field of view of the surveying apparatus and distance measuring light reflected from the object, enters the lens arrangement 110, wherein the beam splitter/combiner 150' is configured to split this reflected light from the object (as well as other structures) traversing the lens arrangement into tracking light along the optical tracker path 131, into imaging light along the optical imaging path 121 and into distance measuring light along the optical distance measuring path 141.

In another embodiment, the surveying apparatus 100A, 100B further comprises a thermal imaging camera configured to acquire an image of at least part of the object in a wavelength range above the visible range. For example, the thermal imaging camera may be an infrared camera replacing the imaging unit 120 in FIG. 1A or 1B, or the tracker 130 in FIG. 1B. The thermal imaging camera may also be provided in addition to the three functional modules 120, 130, and 140 in FIG. 1B so that a different prism system with one more channel needs to be provided.

Figure 1C:
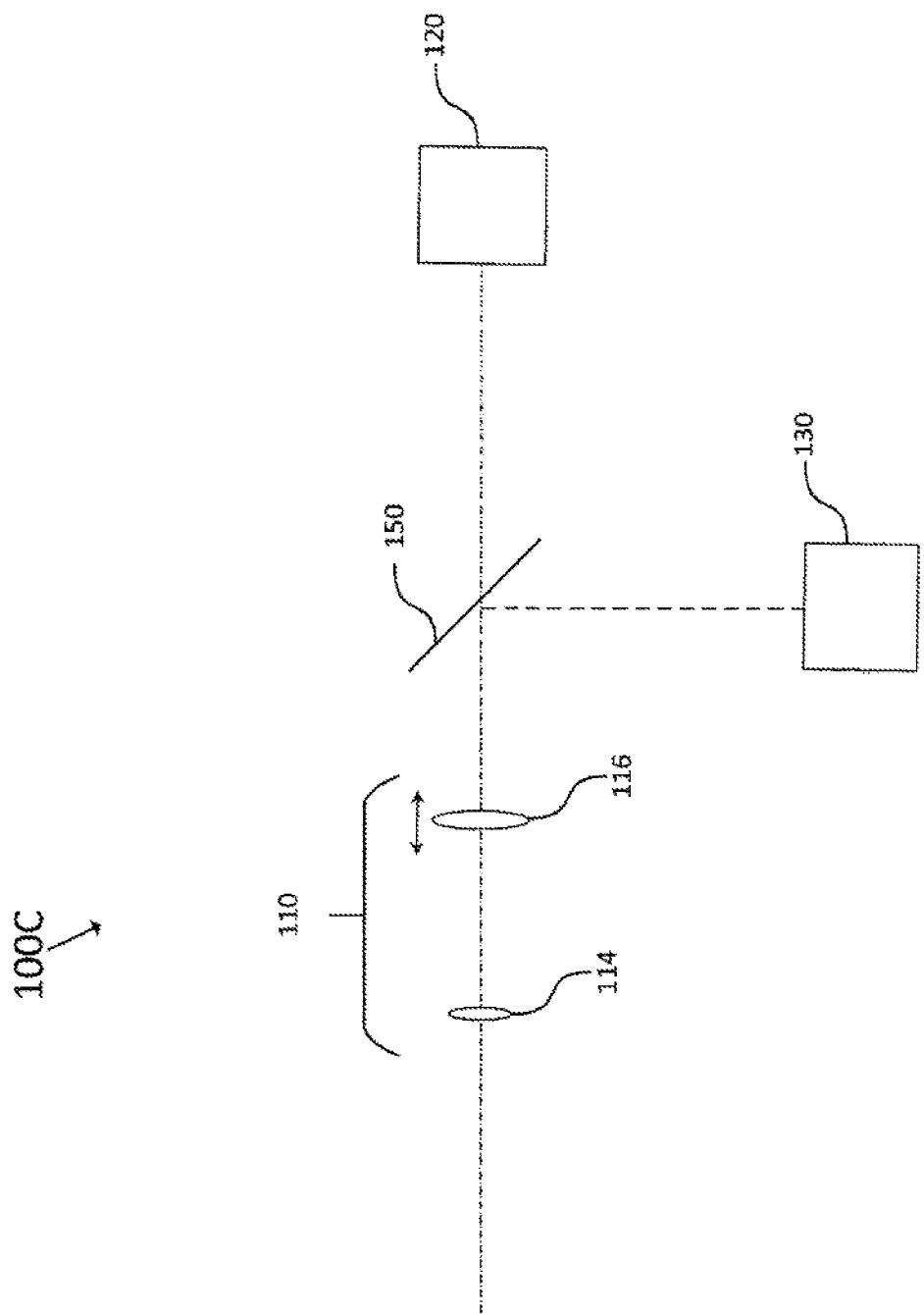
FIG. 1C illustrates elements of another example of a surveying apparatus.

FIG. 1C illustrates elements of another example of a surveying apparatus 100C. The surveying apparatus 100C comprises a lens arrangement 110, an imaging unit 120, a tracker 130 and a beam splitter/combiner 150. The surveying apparatus 100C corresponds to the surveying apparatus 100A but the distance measuring unit 140 is replaced by the tracker 130, wherein details of the tracker 130 were discussed with respect to FIG. 1B.

The surveying apparatus 100A, 100B or 100C may be integrated in or constituted by a video surveying instrument, such as a video theodolite or a video tacheometer, also known as a tachymeter or total station or any other kind of optical instrument used for surveying, and in particular for determining angles and distances to an object to derive the position of the object.

Figure 2:
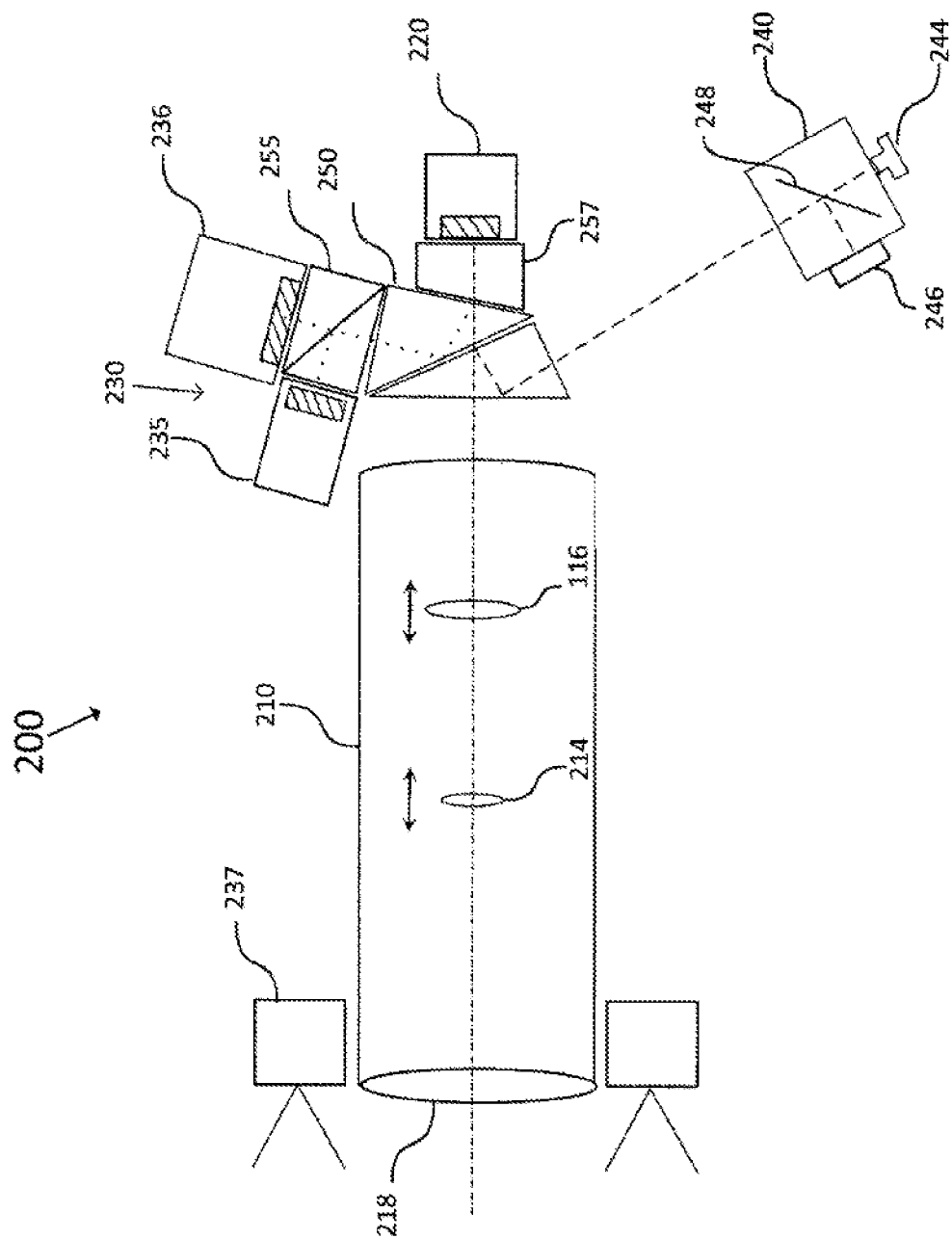
FIG. 2 illustrates a detailed embodiment of a surveying apparatus.

FIG. 2 illustrates a detailed embodiment of a surveying apparatus 200. The surveying apparatus 200 is a detailed example of surveying apparatus 100A, 100B, 100C. Hence, the elements, and particularly details thereof, discussed with respect to FIG. 2 can be combined with elements of the surveying apparatuses 100A, 100B and 100C and vice versa.

In FIG. 2, details of the lens arrangement, tracker, imaging unit and distance measuring unit shown in the previous figures are discussed by referring to lens arrangement 210, tracker 230, imaging unit 220 and distance measuring unit 240.

The lens arrangement 210 is depicted with a housing and a front opening 218. The opening 218 may comprise a fixed final focus lens on the optical axis of the lens arrangement. Further, the lens arrangement 210 comprises the focus lens element 116, which may be a compound lens or an individual lens having preferably a convex side facing the beam splitter/combiner 250. The focus lens element is arranged to be movable in the direction of the optical axis so as to provide different focus settings to sight an object.

The zoom lens element 214 may also be a compound lens or an individual lens and is arranged to be movable in the direction of the optical axis. The zoom lens element 214 is adapted to zoom. In other words, changing the position of the zoom lens element, leads to a change in the field of view. The focus lens element 116 and the zoom lens element 214 form a zoom optic and can be moved by drives. In particular, the lens arrangement is configured to maintain a magnification ratio so that an image size of the object on the imaging unit 220 is maintained constant. This may be achieved by driving the movable focus lens element 116 and the zoom lens element 214 accordingly.

Fixing the zoom optic to a constant magnification ratio has the advantage that objects, such as reflectors, have the same size simplifying image processing. For example, an object of 1 cm in the field has the same number of pixels in an image independent of whether it is at a distance of 10 m or 40 m.

Similarly, for outgoing light, e.g. distance measuring light of the distance measuring unit 240, the spot size of the outgoing laser light has always the same size on the object. Further, moving the lens elements 214, 116 depending on each other reduces the calibration effort.

The lens arrangement 210 is further configured to switch between a narrow field of view and a wide field of view. For example, by adjusting the position of the zoom lens element 214 the field of view obtainable by the lens arrangement can be changed. A wide field of view may be used to obtain an overview image of a scenery in which the object can be easily found and measured and/or tracked, while a narrow field of view may be used for taking a distance measurement. For example, the wide field of view can be used to obtain panoramic images in which measurement points can then be defined. Another advantage of panoramic images is that the images can be used to remotely control the surveying apparatus by viewing the images at a position remote to the surveying apparatus.

The beam splitter/combiner 250 in FIG. 2 is the same one as described with respect to FIGS. 1A, 1B and 1C and may comprise two prisms glued together. In another example, there may be an air gap between the two prisms. In addition to the previous embodiments, interfaces to the functional modules 220 and 230 are shown in more detail. For example, the additional prism element 257 which may form part of the prism system is provided to achieve a good optical connection to the imaging unit 220. In this example, the imaging unit 220 is an electronic imaging device having a camera chip, such as a CCD, which can be glued to the prism element 257. This reduces the need of additional mechanical components for positioning, adjusting and/or fixing the electronic imaging device to the additional prism element. The additional prism element 257 may also be glued to the beam splitter/combiner 250 so as to form a compact unit which should not require any optical adjustments even if mechanical shocks are applied.

The tracker channel of the multi-channel prism system 250 is indicated by a dotted line showing an approximation of the optical axis of the tracker 230. The tracker 230 comprises two tracker receivers 235 and 236 which may be realized by two camera chips schematically illustrated as hashed rectangles. One example of a tracker emitter is illustrated with reference sign 237. This tracker emitter may be made up of LEDs arranged in a ring surrounding the front opening 218 forming an LED array, which is located away from the tracker module 230. These light-emitting diodes (LEDs) may emit infrared light in the same direction as the optical axis of the lens arrangement 210. Tracking light reflected from the object is then received in the lens arrangement 210 and split by the beam splitter/combiner 250 to follow the optical tracker path before being incident on beam splitter 255 which may be a single transparent mirror or prism cube. The beam splitter 255 divides the incoming light into two parts of back-reflected tracking light each preferably comprising 50% of the received intensity.

Accordingly, two images of tracking light reflected by an object and received by the surveying apparatus are obtained either in parallel or sequentially depending on when an image should be acquired. In the same way as discussed with respect to the additional prism element 257, the beam splitter 255 can be glued to the beam splitter/combiner 250 and to the camera chips of the tracker receivers.

In one embodiment, the first image may be acquired when the tracker emitter 237 is on and illuminates the object and the second image may be acquired shortly after when the tracker emitter 237 is off. By subtracting the images a difference image of the tracking light reflected at the object can be derived.

The distance measuring unit 240 in FIG. 2 shows a detailed example of the distance measuring unit 140 comprising a laser 244 and a detector 246 in the same module and having the same optical path for the laser emitter and detector. The laser may emit light in the red, as discussed with respect to FIG. 1A, or in the infrared wavelength range. The laser of the distance measuring unit 240 is adapted to emit laser light which is reflected by the beam splitter/combiner 250 so as to be output coaxially to the optical axis of the lens arrangement.

As schematically illustrated in FIG. 2, the laser light may follow the dashed line first passing the apertured mirror 248 (a.k.a. pinhole mirror) and then entering the beam splitter/combiner 250 where it is twice reflected before being outputted to the lens arrangement 210. After passing the two lenses elements 116 and 214 the focused laser light exits at the front opening 218 and is then reflected by an object (not shown).

The reflected laser light again passes through the lens arrangement 210, is reflected twice in the beam splitter/combiner 250 and is incident on the apertured mirror 248 in the distance measuring unit 240. Alternatively, a beam splitter instead of the aperture mirror (a highly reflective mirror with a pinhole to allow the laser light going through) can be used. This beam splitter may be a 50:50 beam splitter and parts of the reflected laser light are then detected on the detector 246. The detector 246 may be an avalanche photodiode.

Once the detector detects back-reflected measuring light, a controller of the surveying apparatus may use known methods, such as a pulse method or phase method, to perform a distance measurement.

Figure 3:
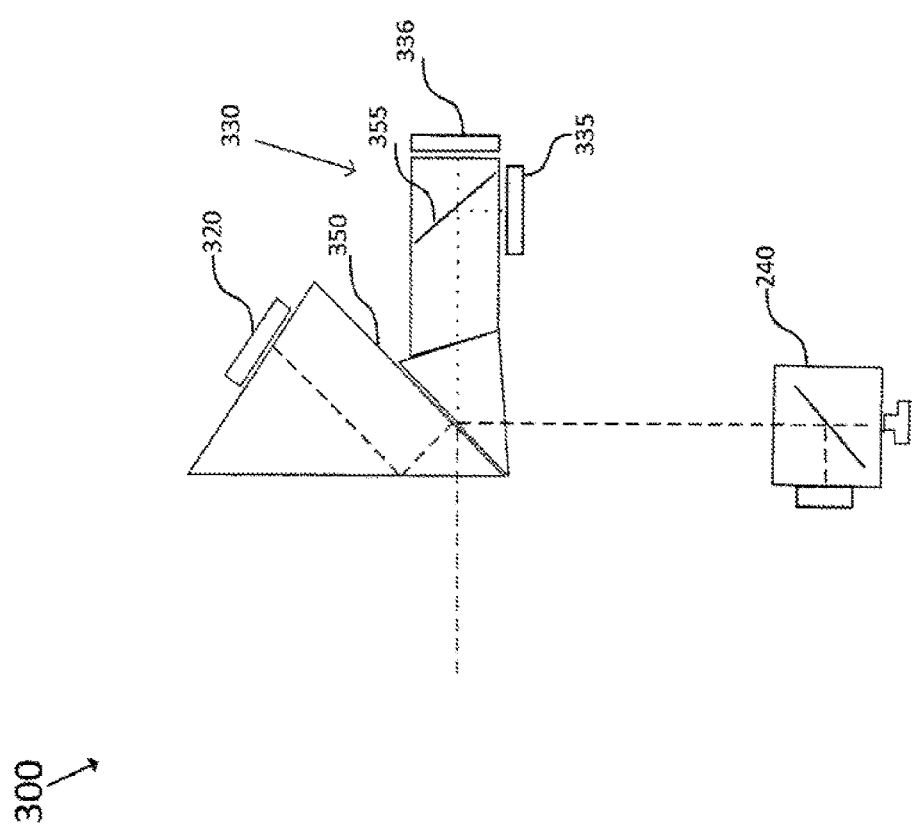
FIG. 3 illustrates a part of a surveying apparatus having an alternative arrangement of functional modules.

FIG. 3 illustrates a part of the surveying apparatus 100A, 100B, 100C, 200 having an alternative arrangement of functional modules.

The beam splitter/combiner 350 again comprises two wedge shaped prisms which, however, are arranged differently to beam splitter/combiner 250 so that also the optical paths are different. In FIG. 3 the imaging/visual channel is located on the top and the visible light coming from the lens arrangement needs to be reflected twice to reach the imaging unit 320. The tracker 330 is again constituted by two tracker receivers 335 and 336 which both receive reflected tracking light from a beam splitter 355. The distance measuring unit 240 is the same as in FIG. 2.

Figure 4:
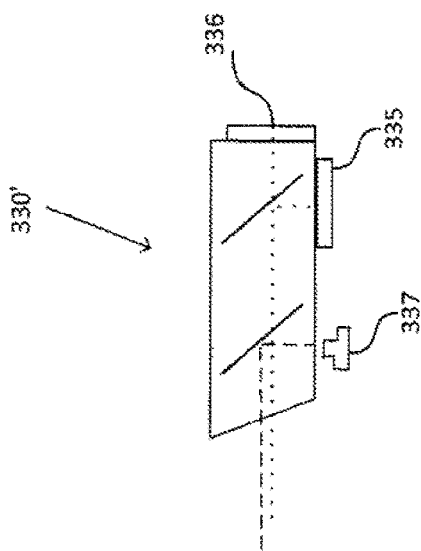
FIG. 4 illustrates a specific example of a tracker which can be used together with the surveying apparatus.

FIG. 4 illustrates a specific example of a tracker which can be used together with the surveying apparatus.

The tracker 330' illustrated in FIG. 4 comprises two tracker receivers 335, 336 and the tracker emitter 337 in the same functional module 330'. It can be understood that the tracker module 330' can replace the tracker 330 in FIG. 3 or the tracker 230 in FIG. 2. The advantage of the tracker 330' over the other trackers is that the light of the tracker emitter 337 has largely the same optical tracker path as the light falling on the tracker receivers. Further, since the tracking light of the tracker emitter 337 passes through the lens arrangement and its lenses, the light can be focused on the object so as to receive a stronger reflection back compared to the case of the tracker emitter 237. However, providing two beam splitters, as shown in FIG. 4, to arrange the optical axes of both tracker receivers and the tracker emitter on the same optical axis as the lens arrangement introduces more optical components and thus more complexity.

Figure 5:
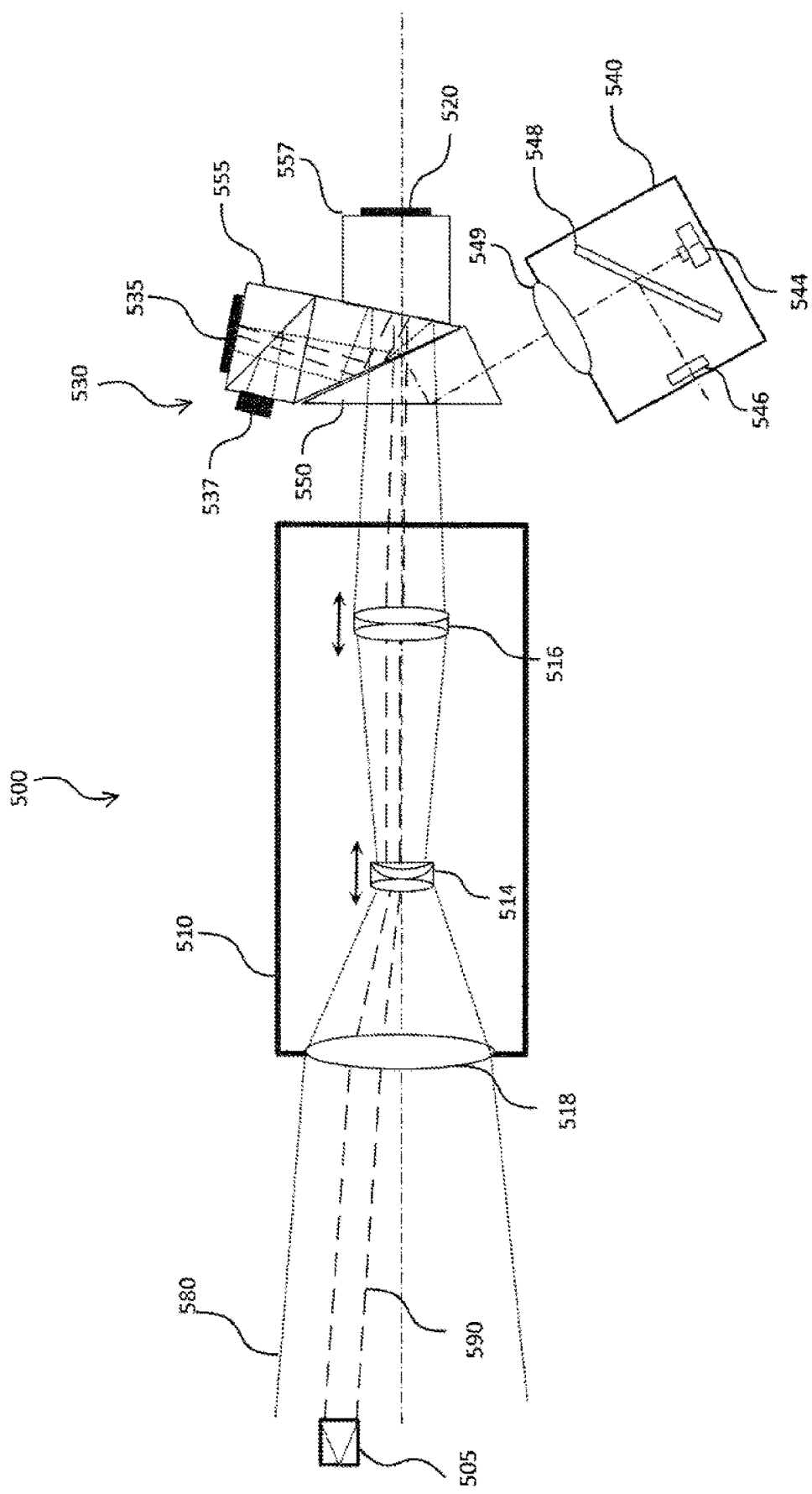
FIG. 5 illustrates a specific embodiment of a surveying apparatus including a tracker and an optical tracker path.

FIG. 5 illustrates a specific embodiment of a surveying apparatus 500 including details of the lens arrangement, tracker, imaging unit and distance measuring unit shown in the previous figures and referred to as lens arrangement 510, tracker 530, imaging unit 520 and distance measuring unit 540 in the following.

Specifically FIG. 5 shows an optical path 580 of the tracker (optical tracker path) by the dotted line passing the edges of the lenses in the lens arrangement 510 including the final focus lens 518, the zoom lens element 514 represented as compound lens, and the focus lens element 516 represented as compound lens, wherein the focus lens element 516 is movably arranged between the final focus lens and the beam splitter/combiner.

The optical tracker path 580 is further indicated in the prism system 550 having multiple reflections at the surfaces and further indicated in the beam splitter cube 555 to which the tracker emitter 537 and the tracker receiver 535 is attached in this example. The optical tracker path 580 can be filled with light from the tracker emitter 537, e.g. comprising one or more infrared (IR) LEDs or an infrared laser at approximately 850 nm. When the tracking light exits the lens arrangement 510 and hits the object 505, which is preferably a reflector made of a triple prism in this example, the reflected light enters again the lens arrangement 510 as a light beam reflected from the target. This light beam is indicated by the dashed line 590. Reflections of this dashed line in the prism system and the position where the light beam hits the tracker receiver 535, e.g. an IR camera chip, is also illustrated in FIG. 5.

Additionally, the reflector 505 and its surroundings may be imaged by the imaging unit 520 which receives visible light through the imaging channel comprising the optical element 557.

The distance measuring unit 540 is discussed in the following. Similar to the distance measuring units 140 and 240, the distance measuring unit 540 comprises a laser 544 and a detector 546. The distance measuring unit 540 is adapted to emit laser light from the laser 544 which passes through the beam splitter 548 and the lens 549 before being incident on the beam splitter/combiner 550. The laser wavelength may be in the red wavelength range, such as 635 nm, and the beam splitter/combiner 550 is adapted to reflect the laser light so as to overlap with the optical axis of the lens arrangement 510 when exiting the beam splitter/combiner 550, illustrated as prism system in FIG. 5.

Therefore, the laser light must pass several optical elements 548, 549, 550, 516, 514, 518 before being reflected by the reflector 505. Hence, back-reflected light may be detected not only from the reflector 505 but also from the other optical elements which could lead to the wrong assumptions regarding the distance to the reflector 505.

In detail, the time of flight of a laser pulse from the laser 544 to the reflector 505 may be used to measure the distance and if one of the several optical elements of the surveying apparatus also provides a reflection which can be detected by the detector 546, the distance measurement result may not be reliable. Therefore, care has been taken to avoid any undesired (multipath) reflections. For example, lens elements 549, 516, 514 and 518 are provided with anti-reflection coatings. Further, the lens element 549 may be chosen such that it focuses the laser light emitted by the laser 544 on an intermediate focus between the lens element 549 and the lower surface of the beam splitter/receiver 550 on which the laser light is incident. In particular, it is desired to avoid an intermediate focus on the prism surface facing the distance measuring unit 540 which could lead to strong back-reflections. Furthermore, this prism surface may be provided with an anti-reflection coating as well.

Additionally, the right lens of the focus lens element 516, i.e. the lens facing the beam splitter/combiner 550, has a convex side facing the beam splitter/combiner 550. This lens may be a plano-convex or a bi-convex lens, as shown. As a result, reflections from this lens of distance measuring light from the distance measuring unit 540 may not easily reflect back into the distance measuring unit 540 and reach the detector 546. Therefore, crosstalk which could lead to the detections of signals not coming from the actual target can be largely avoided.

Crosstalk can further be suppressed by the optical design and orientation of the prism system 550 and the lens groups 514 and 516. For example, the surfaces of the prism system 550 on which light is incident can be slightly tilted with respect to an orthogonal direction so that light is not fully orthogonally incident thereon. Furthermore, air gaps between individual prisms for total reflection can be provided where appropriate.

According to the above, there are several challenges when guiding the laser light of the distance measuring unit 540 through the prism system 550 and the lens arrangement 510 which have hindered the skilled person to consider such a coaxial alignment. By taking care of undesired back reflections, as outlined in the examples above, and by intelligently processing back-reflected light detected by the detector 546, the risk of unreliable measurement results can be mitigated.

For intelligent processing detected light, the surveying apparatus may comprise a controller. The controller, such as controller 608 of FIG. 6, may apply an electronic gating method, e.g. ignoring detected back reflections which are received very shortly after the laser pulse has been emitted so that only reasonable distances to an object of more than 2 m are considered, for example. In particular, the controller may be programmed to ignore detected back reflections which lead to a distance below a predetermined threshold value, e.g. 2 m. The functions of controller 608 may be distributed over the individual units of the surveying apparatus 600. In particular, the control function of the electronic gating method may be provided directly in the distance measuring unit 640.

On the other hand, using the optical setup shown in FIG. 5, the performance of the distance measuring unit, the tracker and lens arrangement can be improved compared to simple bi-axial systems, in which the optical axis of the lens arrangement and the optical axis of the laser measuring unit do not overlap. In the surveying apparatus 500 of FIG. 5, when guiding the laser light of the distance measuring unit 540 through the prism system 550 and the lens arrangement 510, the optics of the lens arrangement can be controlled to focus the laser light on the reflector 505 which leads to a better signal-to-noise ratio when receiving back reflected light. Additionally, the focused laser spot on the reflecting object is smaller than without focusing so that a higher resolution of the object can be obtained.

Figure 6:
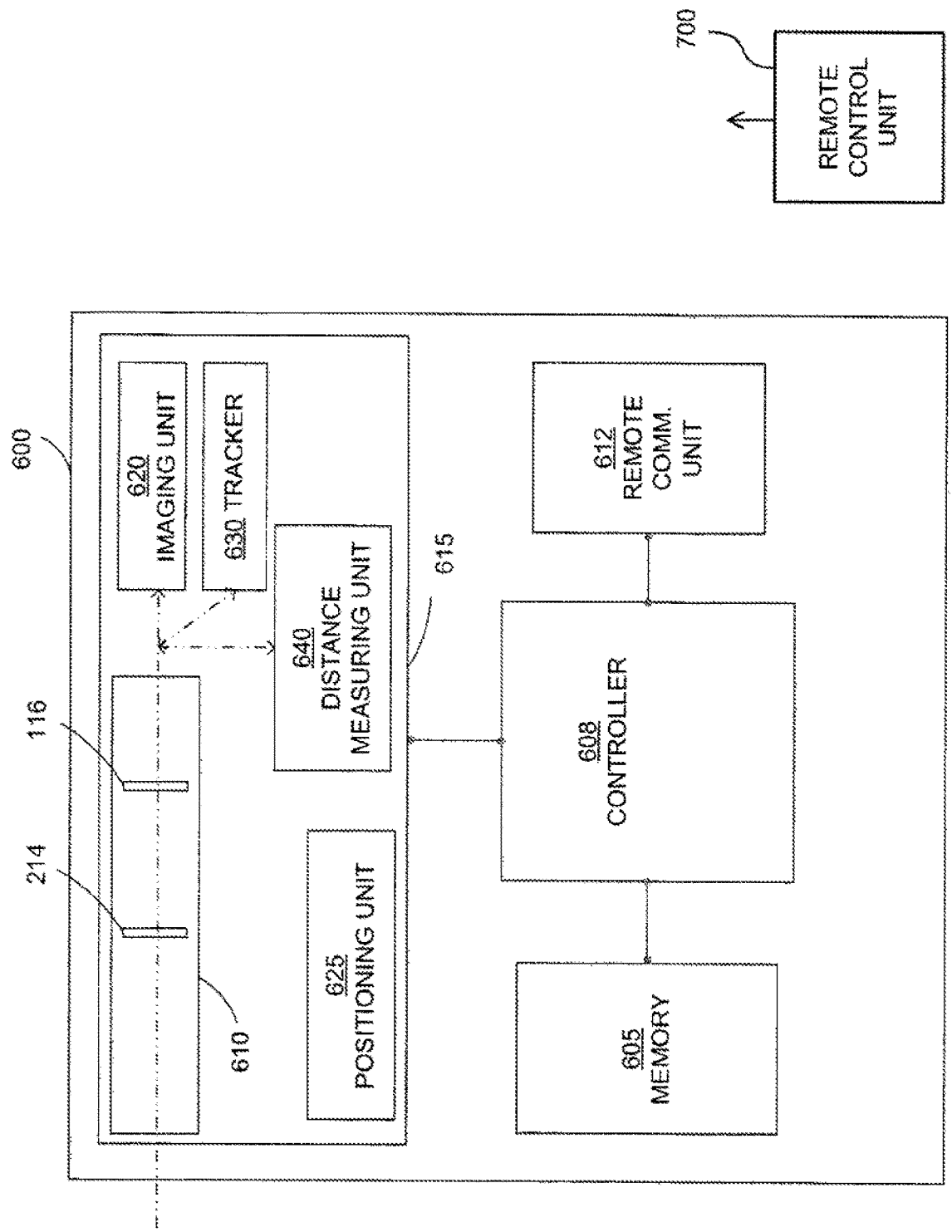
FIG. 6 illustrates elements of a surveying apparatus in a surveying system according to another embodiment emphasizing the communication and control between elements on a functional level.

FIG. 6 illustrates elements of a surveying apparatus 600 in a surveying system according to another embodiment emphasizing the communication and control between elements on a functional level. In addition to the surveying apparatus 600, the system may comprise the remote control unit 700 which can be used by an operator to control the surveying apparatus 700 or total station including such an apparatus.

The surveying apparatus 600 comprises an acquisition unit 615, a controller 608, memory 605 and remote communication unit 612 which may communicate with the remote control unit 700 to receive instructions therefrom.

The acquisition unit 615 may form a part of the head of a total station and comprises the lens arrangement 610 including the lens elements 214 and 116, the imaging unit 620, the tracker 630 and the distance measuring unit 640. Since the illustration in FIG. 6 is not concerned with the optical setup but explains the surveying apparatus 600 on a functional level, details about a prism system and the combination of different optical paths have been avoided and it is referred to the previous figures for details. The acquisition unit 615 further comprises a positioning unit 625 which is provided for adjusting the optical axis of the lens arrangement 610 relative to a reference axis, such as an axis of a polar coordinate system including a distance and two angles. For example, the positioning unit is realized by an electromechanical arrangement comprising preferably servo drives for precisely positioning the acquisition unit 615.

Accordingly, the positioning unit 625 may move the lens arrangement 610 to follow a moving object. In detail, when the optical arrangement 610 sights an object, the tracker 620 may track the sighted object. The tracker 620 may evaluate the movement of the object, e.g. in the controller 608, and may issue an instruction to the positioning unit 625 to move the optical axis of the lens arrangement. In this way, the head of the surveying apparatus or total station including the surveying apparatus may be moved to follow the object (target).

The control of the functional modules may constitute individual control elements controlling each module individually and being located close to or in the functional modules. The control elements may be realized by a hardware arrangement, such as hard-wired circuits or ASICs (application specific integrated circuits) or software or any suitable combination of the above. In particular, the control of the functions performed by the lens arrangement 610, the tracker 630, the imaging unit 620 and the distance measuring unit 640 may be realized by software.

In the surveying apparatus 600 of FIG. 6 individual control elements are combined in the controller 608. For example, a tracking control element, an imaging control element and a distance measuring control element may be realized by a processor running different software codes which may be stored in the memory 605.

Furthermore, the controller 608 may be configured to analyze the image of the object acquired by the imaging unit 620 and configured to issue an instruction to the lens arrangement 610 to move one or more lenses of the lens arrangement so as to maintain an image size of the object on the imaging unit constant and/or lens movement may be used for the autofocus. In the same way, the controller 608 may be configured to analyze the image of the object acquired by the tracker receiver of the tracker 630 and configured to issue an instruction to the lens arrangement 610 to move one or more lenses of the lens arrangement so as to maintain an image size of the object on the tracker receiver constant. Further, the controller 608 may be configured to analyze the back-reflected light detected by the detector of the distance measuring unit and calculate the distance to the object by considering the time when the laser pulse of the laser was emitted and the time when the back-reflected light was detected.

It will be apparent to those skilled in the art that various modifications and variations can be made in the apparatuses of the invention without departing from the scope of or spirit of the invention.

The invention has been described in relation to particular examples which are intended in all respect to be illustrative rather than restrictive. Those skilled in the art will appreciate that many different combinations of hardware, software and firmware will be suitable for practicing the present invention.

Moreover, other implementations of the invention will be apparent to those skilled in the art from consideration of the specification and practice of the invention disclosed herein. It is intended that the specification and the examples be considered as exemplary only. To this end, it is to be understood that inventive aspect lie in less than all features of a single foregoing disclosed implementation or configuration. Thus, the true scope and spirit of the invention is indicated by the following claims.

The invention claimed is:

1. Surveying apparatus for surveying an object, comprising:
    a lens arrangement including at least one movably arranged focus lens element for focusing to sight the object;
    an imaging unit configured to obtain an image of at least a part of the object;
    a distance measuring unit configured to measure a distance to the object along an optical axis of the distance measuring unit;
    a beam splitter/combiner configured to combine a part of an optical imaging path of the imaging unit and a part of an optical distance measuring path of the distance measuring unit so that the optical axis of the imaging unit and the optical axis of the distance measuring unit are at least coaxially arranged with the optical axis of the lens arrangement between the lens arrangement and the beam splitter/combiner; and
    a tracker configured to track the object, wherein the beam splitter/combiner is further configured to combine a part of an optical tracker path of the tracker, the part of the optical imaging path of the imaging unit, and the part of the optical distance measuring path of the distance measuring unit so that an optical axis of the tracker, the optical axis of the imaging unit, and the optical axis of the distance measuring unit are at least coaxially arranged with the optical axis of the lens arrangement between the lens arrangement and the beam splitter/combiner;
    wherein the distance measuring unit comprises a laser and a detector; and
    wherein the beam splitter/combiner is configured to split light reflected from the object traversing the lens arrangement into imaging light along the optical imaging path and into distance measuring light along the optical distance measuring path.

2. Surveying apparatus according to claim 1, wherein the lens arrangement includes a movably arranged zoom lens element for zooming.

3. Surveying apparatus according to claim 1, wherein the lens arrangement is configured to maintain a magnification ratio so that an image size of the object on the imaging unit is maintained constant.

4. Surveying apparatus according to claim 1, wherein the lens arrangement is configured to switch between a narrow field of view and a wide field of view.

5. Surveying apparatus according to claim 1, wherein the lens in the lens arrangement facing the beam splitter/combiner has a convex side facing the beam splitter/combiner.

6. Surveying apparatus according to claim 1, wherein the tracker comprises a tracker receiver and/or a tracker emitter for emitting tracking light on the optical tracker path.

7. Surveying apparatus according to claim 1, wherein the tracker comprises two tracker receivers each receiving a part of back-reflected tracking light split by a beam splitter.

8. Surveying apparatus according to claim 1, wherein the tracker is adapted to issue an instruction to the surveying apparatus to move the optical axis of the lens arrangement.

9. Surveying apparatus according to claim 1, wherein the laser of the distance measuring unit is preferably adapted to emit laser light which is reflected by the beam splitter/combiner so as to be output coaxially to the optical axis of the lens arrangement.

10. Surveying apparatus according to claim 1, wherein the beam splitter/combiner comprises at least two wedge shaped prisms and/or wavelength selective surfaces.

11. Surveying apparatus according to claim 1, further comprising a controller configured to analyze the image of the object acquired by the imaging unit and configured to issue an instruction to the lens arrangement to move one or more lenses of the lens arrangement so as to maintain a constant size of the object on the imaging unit.

12. Surveying apparatus according to claim 1, wherein the lens arrangement further comprises a final focus lens on its optical axis, wherein the movably arranged focus lens element is arranged between the final focus lens and the beam splitter/combiner.

13. Surveying apparatus according to claim 1, further comprising a thermal imaging camera configured to acquire an image of at least part of the object.

14. Surveying system comprising a remote control unit and the surveying apparatus according to claim 1, wherein the surveying apparatus comprises a communication interface to communicate with the remote control unit.

* * * * *